(12) United States Patent
Hagihara

(10) Patent No.: US 12,498,557 B2
(45) Date of Patent: Dec. 16, 2025

(54) IMAGE PICKUP APPARATUS, ENDOSCOPE, AND METHOD OF MANUFACTURING IMAGE PICKUP APPARATUS

(71) Applicant: OLYMPUS CORPORATION, Tokyo (JP)

(72) Inventor: Mitsuru Hagihara, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 130 days.

(21) Appl. No.: 18/387,167

(22) Filed: Nov. 6, 2023

(65) Prior Publication Data

US 2024/0069326 A1   Feb. 29, 2024

Related U.S. Application Data

(63) Continuation of application No. PCT/JP2021/027025, filed on Jul. 19, 2021.

(51) Int. Cl.
*G02B 23/24* (2006.01)
*G02B 7/02* (2021.01)

(52) U.S. Cl.
CPC ......... *G02B 23/2484* (2013.01); *G02B 7/025* (2013.01); *G02B 23/2407* (2013.01)

(58) Field of Classification Search
CPC ......... H01L 27/14685; H01L 27/14627; H01L 27/14632; H01L 27/14687; G02B 13/0085; G02B 13/00; G02B 7/02; G02B 23/2484; G02B 7/00; B29D 11/00375; B29D 11/00; A61B 1/00
See application file for complete search history.

(56) References Cited

U.S. PATENT DOCUMENTS

2008/0290435 A1*  11/2008  Oliver ................. H10F 39/026
                                                 438/65
2010/0073534 A1    3/2010  Yano et al.
2010/0117176 A1*  5/2010  Uekawa ............... H10F 39/026
                                                 257/E31.127
(Continued)

FOREIGN PATENT DOCUMENTS

JP    2010-080591 A    4/2010
JP    2010-103493 A    5/2010
JP    2019-066610 A    4/2019
(Continued)

OTHER PUBLICATIONS

International Search Report dated Oct. 12, 2021 received in PCT/JP2021/027025.

*Primary Examiner* — Xi Wang
(74) *Attorney, Agent, or Firm* — Scully, Scott, Murphy & Presser, P.C.

(57) ABSTRACT

An image pickup apparatus includes a lens unit and an image pickup unit. The lens unit includes a plurality of optical devices including a first optical device that includes: a first glass substrate having a first principal surface and a second principal surface and a groove leading to the second principal surface from the first principal surface in at least one of four corners on an outer edge; first resin disposed in the groove; and a resin lens disposed on the second principal surface. The image pickup unit including an image pickup device is disposed on an optical device not including the first resin, of the plurality of optical devices.

11 Claims, 9 Drawing Sheets

(56) References Cited

U.S. PATENT DOCUMENTS

2018/0108697 A1\* 4/2018 Matsugai ......... B29D 11/00375
2021/0193521 A1\* 6/2021 Shigematsu ............ H01L 22/26

FOREIGN PATENT DOCUMENTS

| WO | 2017/203592 A1 | 11/2017 |
| WO | 2017/212520 A1 | 12/2017 |
| WO | 2019/065293 A1 | 4/2019 |
| WO | 2020/183600 A1 | 9/2020 |

\* cited by examiner

IMAGE PICKUP APPARATUS, ENDOSCOPE, AND METHOD OF MANUFACTURING IMAGE PICKUP APPARATUS

CROSS REFERENCE TO RELATED APPLICATION

This application is a continuation application of PCT/JP2021/027025 filed on Jul. 19, 2021, the entire contents of which are incorporated herein by this reference.

BACKGROUND OF THE INVENTION

1. Field of the Invention

The present invention relates to an image pickup apparatus including a lens unit having a hybrid lens device, an endoscope including the image pickup apparatus including the lens unit having the hybrid lens device, and a method of manufacturing the image pickup apparatus including the hybrid lens device.

2. Description of the Related Art

It is important to reduce a diameter of a lens unit of an image pickup apparatus disposed in a distal end portion of an endoscope for alleviating invasiveness.

International Publication No. 2017/203592 discloses a method of efficiently manufacturing a lens unit with a small diameter that is a wafer-level stack body by cutting a stacked wafer in which optical wafers, each including a plurality of optical devices, are stacked.

SUMMARY OF THE INVENTION

An image pickup apparatus of an embodiment includes: a lens unit including a plurality of optical devices including a first optical device that includes: a first glass substrate having a first principal surface and a second principal surface on a side opposite to the first principal surface, and a groove leading to the second principal surface from the first principal surface in at least one of four corners on an outer edge; first resin disposed in the groove of the first glass substrate; and a resin lens disposed on the second principal surface; and an image pickup unit including an image pickup device and being disposed on an optical device not including the first resin, of the plurality of optical devices.

An endoscope of an embodiment includes an image pickup apparatus that includes: a lens unit including a plurality of optical devices including a first optical device that includes: a first glass substrate having a first principal surface and a second principal surface on a side opposite to the first principal surface, and a groove leading to the second principal surface from the first principal surface in at least one of four corners on an outer edge; first resin disposed in the groove of the first glass substrate; and a resin lens disposed on the second principal surface; and an image pickup unit including an image pickup device and being disposed on an optical device not including the first resin, of the plurality of optical devices.

A method of manufacturing an image pickup apparatus of an embodiment includes forming a plurality of holes disposed in a grid pattern on a glass wafer; filling the plurality of holes with first resin; disposing a plurality of resin lenses on the glass wafer to produce a first lens wafer including an incident surface; stacking a plurality of optical device wafers including the first lens wafer to produce a stacked wafer; and dicing the stacked wafer along cut lines including the plurality of holes filled with the first resin.

DETAILED DESCRIPTION OF THE PREFERRED EMBODIMENTS

First Embodiment

Figure 1:
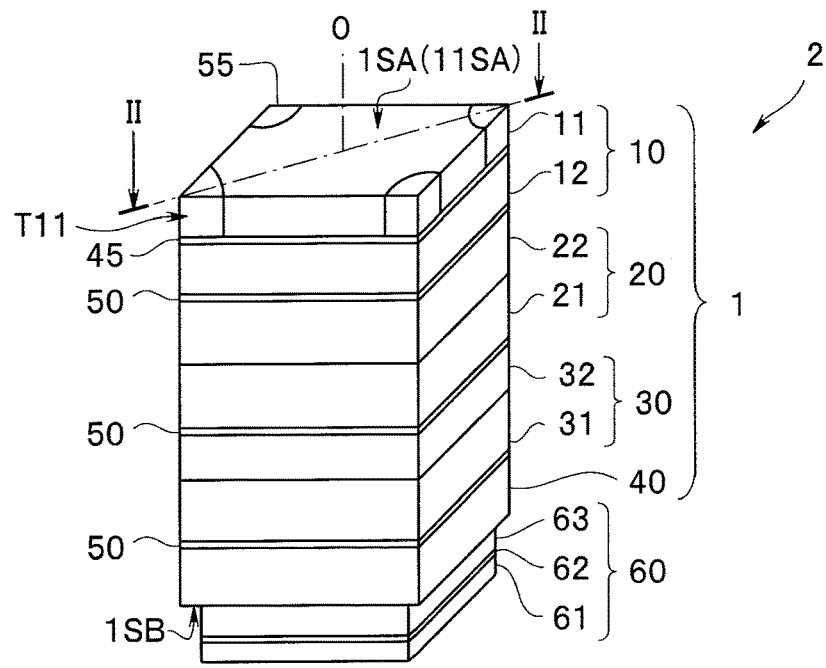
FIG. 1 is a perspective view of an image pickup apparatus of a first embodiment.
Figure 2:
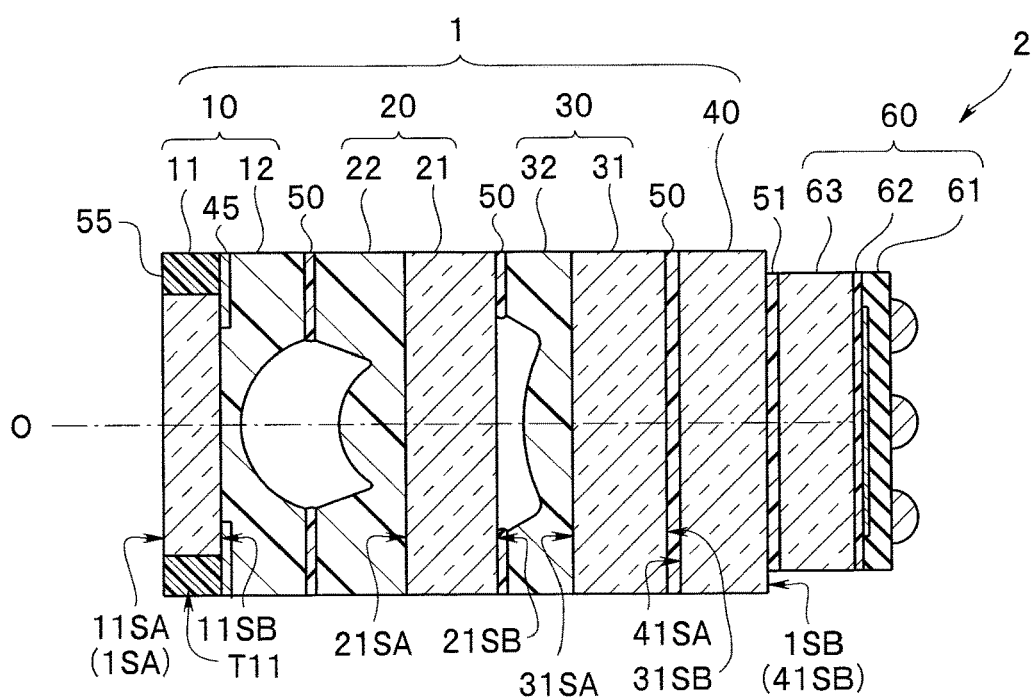
FIG. 2 is a cross-sectional view taken along line II-II of FIG. 1.

An image pickup apparatus 2 of an embodiment shown in FIG. 1 and FIG. 2 includes a lens unit 1 and an image pickup unit 60 of the embodiment. A reference numeral O indicates an optical axis of the lens unit 1. The image pickup unit 60 receives light of a subject image condensed by the lens unit 1 to convert the subject image into an image pickup signal.

Note that in the following description, the drawings based on the embodiments are schematic illustrations. The relation between the thickness and the width of each portion, the ratio in thickness and the relative angle of each portion, and the like differ from the actual components. There are also some portions with different dimensional relations and ratios among the drawings. Illustration of part of the constituent elements will be omitted.

The lens unit 1 is in a substantially rectangular parallelepiped shape including a first optical device 10 including an incident surface 1SA, a second optical device 20, a third optical device 30, and a fourth optical device 40 including an emission surface 1SB on a side opposite to the incident surface 1SA. The first optical device 10, the second optical device 20, the third optical device 30, and the fourth optical device 40 are stacked in this order.

The first optical device 10 includes, as a base body, a first glass substrate 11 including a first principal surface 11SA as the incident surface 1SA and a second principal surface 11SB on a side opposite to the first principal surface 11SA. The first optical device 10 is a hybrid lens device including a resin lens 12 that is a concave lens on the second principal surface 11SB. An aperture layer 45 made of metal including chromium or titanium as a main component is disposed on the second principal surface 11SB.

The second optical device 20 includes, as a base body, a second glass substrate 21 including a third principal surface 21SA and a fourth principal surface 21SB on a side opposite to the third principal surface 21SA. The third principal surface 21SA is disposed facing the second principal surface 11SB. The second optical device 20 is a hybrid lens device including a resin lens 22 that is a convex lens on the third principal surface 21SA.

The third optical device 30 includes, as a base body, a third glass substrate 31 including a fifth principal surface 31SA and a sixth principal surface 31SB on a side opposite to the fifth principal surface 31SA. The fifth principal surface 31SA is disposed facing the fourth principal surface 21SB. The third optical device 30 is a hybrid lens device including a resin lens 32 that is a convex lens on the fifth principal surface 31SA.

The fourth optical device 40 is a fourth glass substrate including a seventh principal surface 41SA and an eighth principal surface 41SB as the emission surface 1SB on a side opposite to the seventh principal surface 41SA. The seventh principal surface 41SA is disposed facing the sixth principal surface 31SB. The fourth optical device 40 is a glass filter that removes unnecessary infrared light (for example, light with a wavelength equal to or greater than 700 nm).

The first glass substrate 11, the second glass substrate 21, the third glass substrate 31, and the fourth glass substrate (the fourth optical device) 40 are made of, for example, borosilicate glass, quartz glass, or sapphire glass.

The first optical device 10 and the second optical device 20, the second optical device 20 and the third optical device 30, and the third optical device 30 and the fourth optical device 40 are respectively adhesively bonded by means of an adhesive layer 50 made of resin.

Note that the configuration of the lens unit of the present invention is not limited to the configuration of the lens unit 1 of the present embodiment, and is determined in accordance with the specification. For example, the lens unit may include a spacer element that defines a distance between the lenses and a plurality of aperture layers in addition to the lens device.

The image pickup unit 60 is adhesively bonded to the eighth principal surface 41SB (emission surface 1SB) of the fourth optical device 40 by means of an adhesive layer 51. In the image pickup unit 60, a cover glass 63 is adhesively bonded to an image pickup device 61 by means of an adhesive layer 62. The lens unit 1 forms a subject image on the image pickup device 61. The image pickup device 61 is a CMOS (complementary metal oxide semiconductor) light receiving element or a CCD (charge coupled device).

In the first glass substrate 11 of the first optical device 10, grooves T11, which are cutout portions leading to the second principal surface 11SB from the first principal surface 11SA, are present in four corners on an outer edge of the first principal surface 11SA (second principal surface 11SB). The grooves T11 are filled with first resin 55. The first principal surface 11SA (second principal surface 11SB) filled with the first resin 55 (hereinafter also referred to as "resin 55") is substantially square. Meanwhile, the second optical device 20, the third optical device 30, and the fourth optical device 40 do not include the first resin 55.

As will be described later, the first glass substrate 11 is produced by cutting a glass wafer 11W. In the glass wafer 11W, holes H11 are present in regions (regions where cut lines cross each other) that become the four corners of the first glass substrate 11, and the holes H11 are filled with the first resin 55 (see FIG. 8). The holes H11 become the grooves T11 through cutting. Since the four corners in which chipping is likely to occur in cutting are filled with the first resin 55, the lens unit 1 and the image pickup apparatus 2 are easy to manufacture and are highly reliable because of no chipping on the glass substrate. Note that of the plurality of glass substrates of the lens unit 1, the first glass substrate 11 is the glass substrate including the incident surface 1SA in which chipping is most likely to occur in cutting.

<Manufacturing Method>

The lens unit 1 is a wafer-level optical unit in a substantially rectangular parallelepiped shape that is manufactured by cutting a stacked wafer 1W in which a plurality of lens wafers, each including the plurality of optical devices disposed in a matrix, are stacked.

Figure 3:
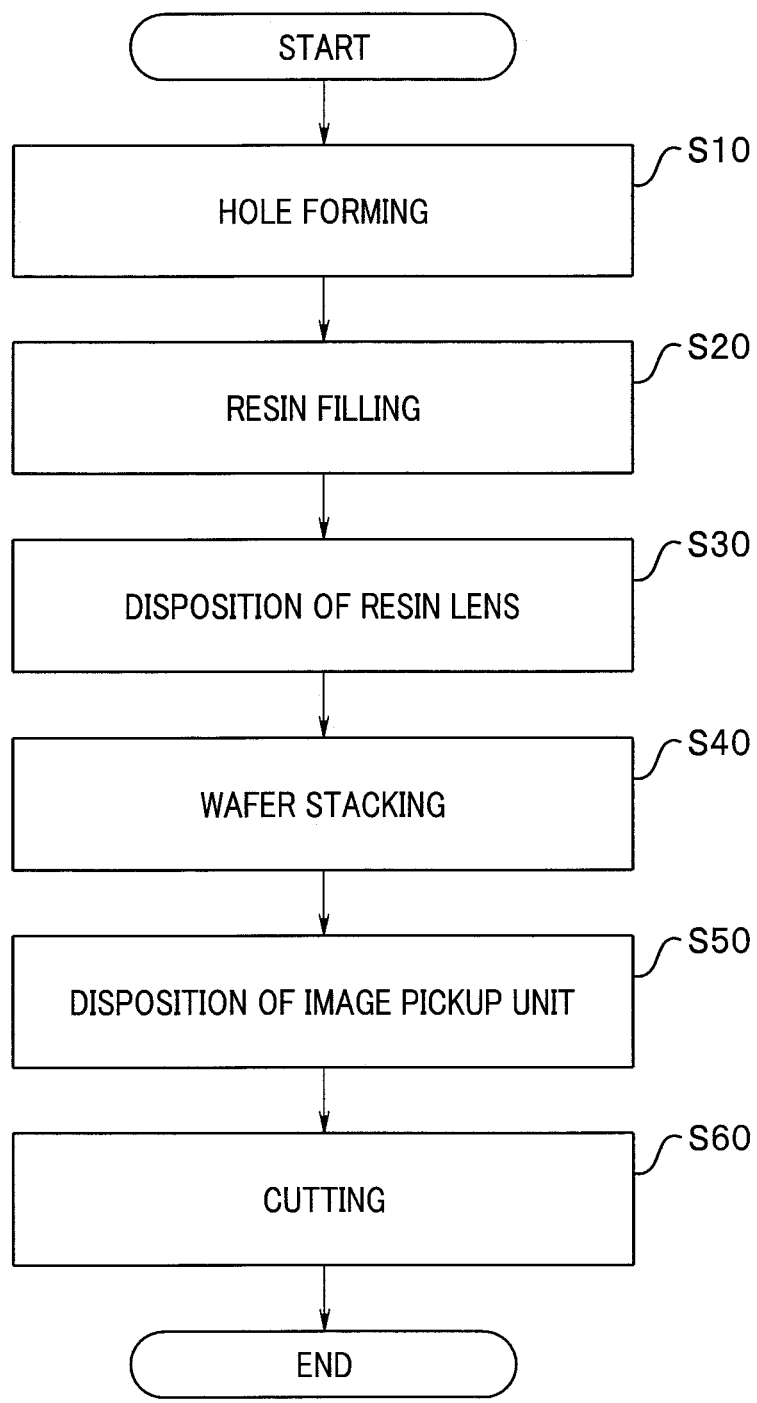
FIG. 3 is a flowchart of a manufacturing method of the image pickup apparatus of the first embodiment.

Hereinafter, a manufacturing method of the image pickup apparatus 2 by cutting a stacked wafer 2W in which the plurality of image pickup units 60 are disposed on the stacked wafer 1W will be described as an example following a flowchart of FIG. 3.

<Step S10> Hole Forming

Figure 4A:
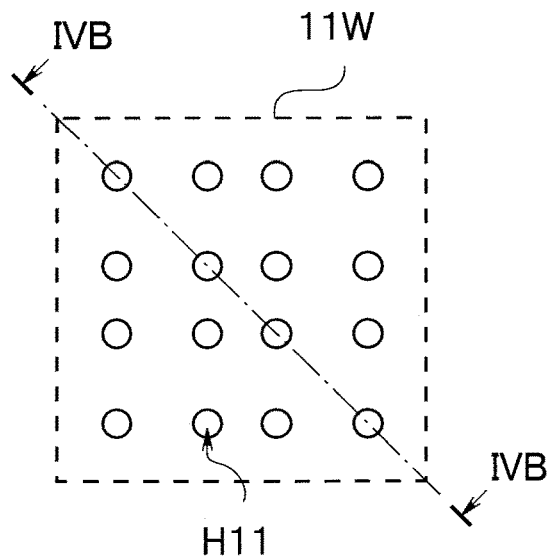
FIG. 4A is a plan view for explaining the manufacturing method of the image pickup apparatus of the first embodiment.
Figure 4B:
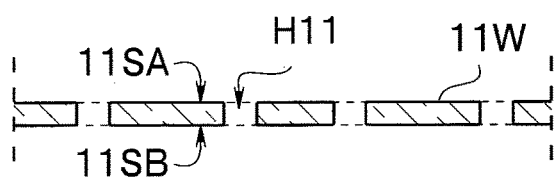
FIG. 4B is a cross-sectional view taken along line IVB-IVB of FIG. 4A.

As shown in FIG. 4A and FIG. 4B, the glass wafer 11W includes the first principal surface 11SA and the second principal surface 11SB on a side opposite to the first principal surface 11SA. The plurality of holes H11 are formed in a grid pattern on the glass wafer 11W. The holes H11 are formed using etching or drilling.

In isotropic wet etching using an alkaline aqueous solution, such as a KOH solution or a TMAH (tetramethylammonium hydroxide) solution, a wall surface of the hole H11 is inclined. For example, an opening of the first principal surface 11SA is larger than an opening of the second principal surface 11SB, while in drilling and deep reactive ion etching (D-RIE), the wall surface of the hole H11 is perpendicular to the first principal surface 1SA. The opening of the hole H11 may be rectangular.

<Step S20> Resin Filling

Figure 5A:
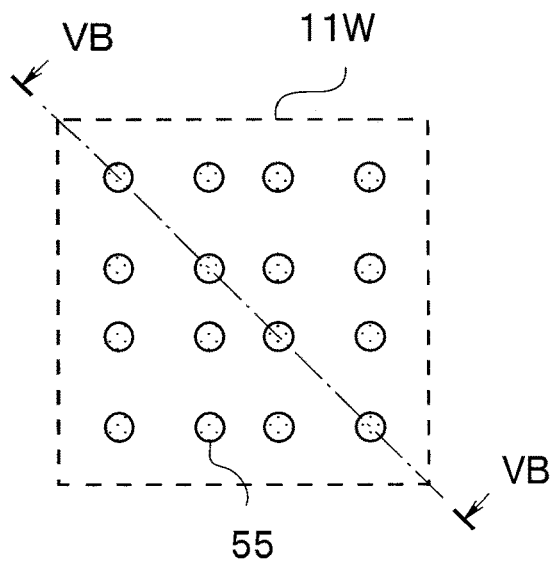
FIG. 5A is a plan view for explaining the manufacturing method of the image pickup apparatus of the first embodiment.
Figure 5B:
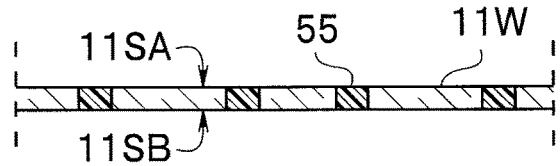
FIG. 5B is a cross-sectional view taken along line VB-VB of FIG. 5A.

As shown in FIG. 5A and FIG. 5B, the plurality of holes H11 are each filled with the first resin 55. The first resin 55 that is thermosetting or ultraviolet curable epoxy resin is disposed in the plurality of holes H11 using an inkjet method, for example, and then, curing treatment is performed. In a case where the first resin 55 protrudes from the holes H11 or is also disposed around the holes H11, for example, polishing or ashing is performed. When the principal surface of the glass wafer 11W is polished by polishing, the thickness of the glass wafer 11W is set such that the thickness after polishing becomes the thickness in the specification.

<Step S30> Disposition of Resin Lens

Figure 6A:
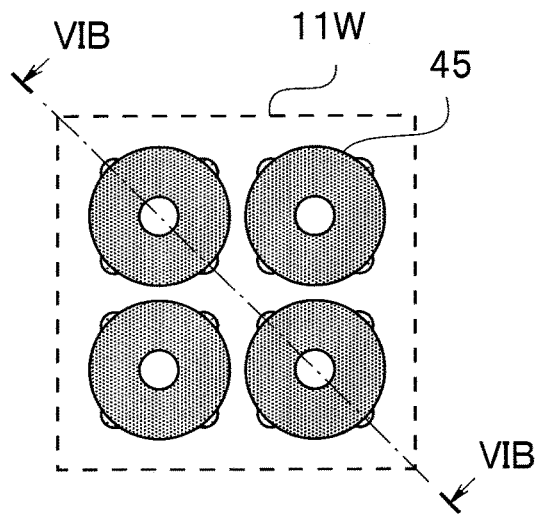
FIG. 6A is a plan view for explaining the manufacturing method of the image pickup apparatus of the first embodiment.
Figure 6B:
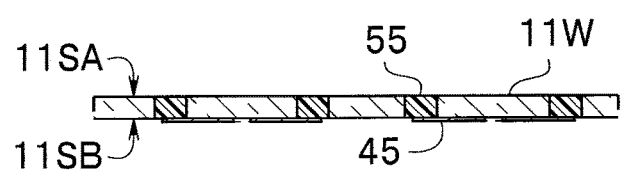
FIG. 6B is a cross-sectional view taken along line VIB-VIB of FIG. 6A.

As shown in FIG. 6A and FIG. 6B, the aperture layer 45 is disposed on the second principal surface 11SB of the glass wafer 11W before the resin lens is disposed. For example, a metal layer disposed on the second principal surface 11SB is patterned using a sputtering method, so that the plurality of aperture layers 45 are produced. The aperture layer 45 includes chromium or titanium as a main component. The "main component" means accounting for 90% or more by weight. Note that the aperture layer 45 is not an essential constituent element.

Figure 7A:
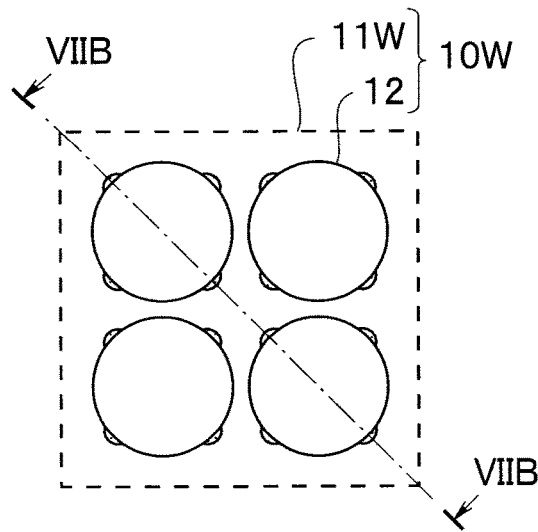
FIG. 7A is a plan view for explaining the manufacturing method of the image pickup apparatus of the first embodiment.
Figure 7B:
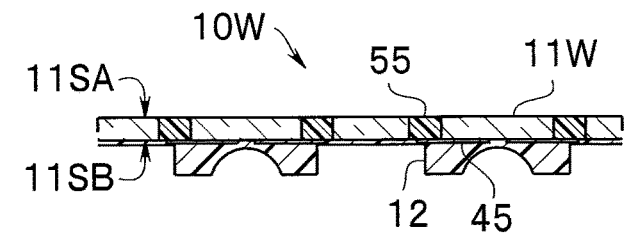
FIG. 7B is a cross-sectional view taken along line VIIB-VIIB of FIG. 7A.

As shown in FIG. 7A and FIG. 7B, the resin lens 12 is disposed on the second principal surface 11SB of the glass wafer 11W where the aperture layer is disposed, so that a first lens wafer (first optical device wafer) 10W is produced. It is preferable that energy curable resin should be used for second resin of the resin lens 12.

Cross-linking reaction or polymerization reaction of the energy curable resin proceeds by reception of energy such as heat, ultraviolet light, and electron beam from outside. For example, the energy curable resin includes transparent ultraviolet curing silicone resin, epoxy resin, or acrylic resin. Note that "transparent" means that a material has less light absorption and less scattering in such a degree that the material can endure in use in a use wavelength range.

The resin lens 12 is produced using a mold method in which uncured resin, which is thus liquid or gel, is disposed on the glass wafer 11W and ultraviolet light is irradiated to cure the resin in a state of being pressed by a mold having a recessed portion with a predetermined inner surface shape. Note that silane coupling treatment or the like is preferably performed on the glass wafer before the resin is disposed to improve an interface adhesive strength between the glass and the resin.

Since the inner surface shape of the mold is transferred to an outer surface shape of the resin lens manufactured using the mold method, it is possible to easily produce a configuration having an outer periphery portion which also functions as a spacer and an aspherical lens.

<Step S40> Wafer Stacking

Figure 8:
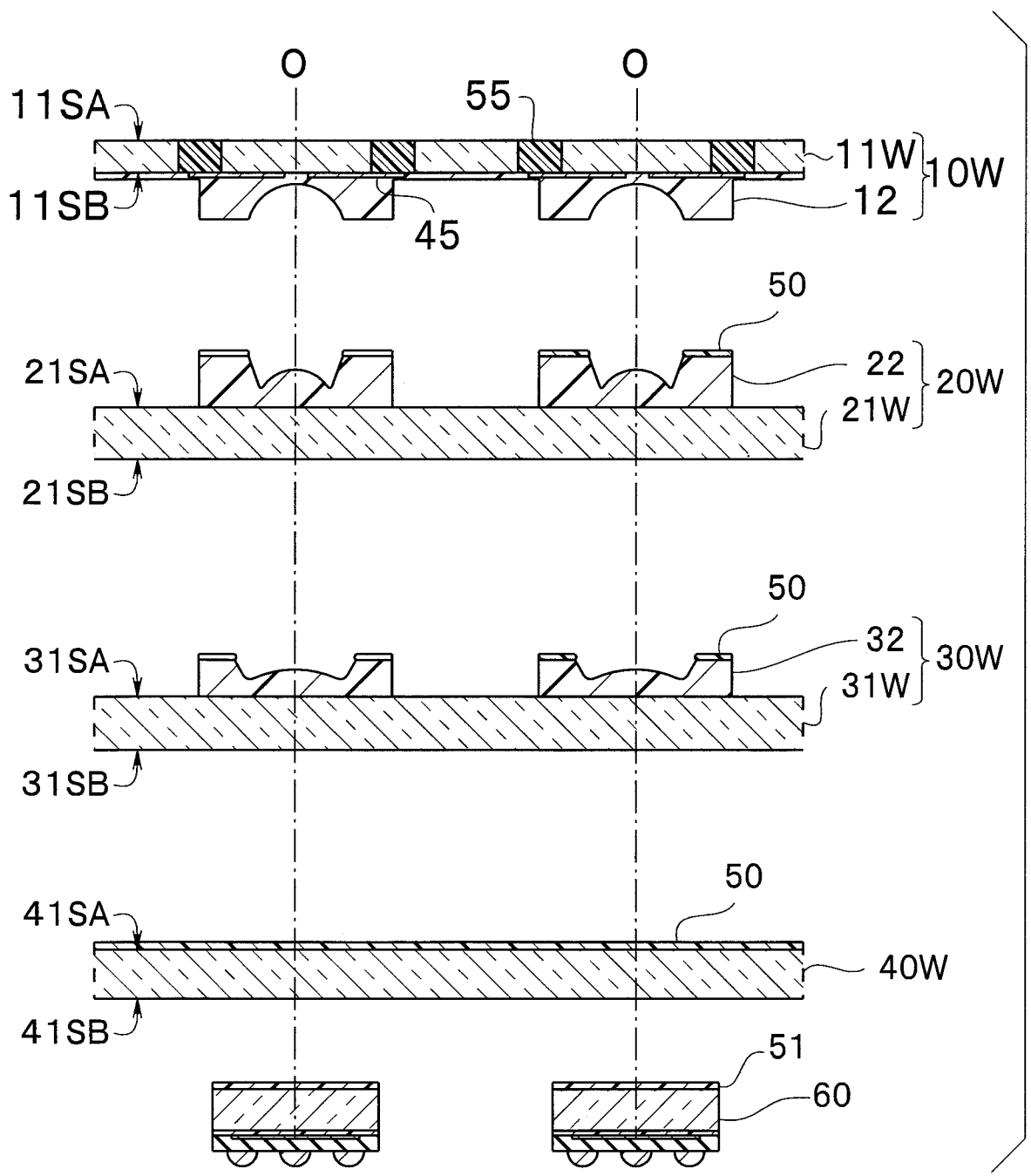
FIG. 8 is an exploded cross-sectional view for explaining the manufacturing method of the image pickup apparatus of the first embodiment.

Lens wafers 20W, 30W shown in FIG. 8 are optical device wafers produced in the same manner as the first lens wafer 10W. The lens wafer 20W includes, as a base body, a glass wafer 21W including the third principal surface 21SA and the fourth principal surface 21SB on a side opposite to the third principal surface 21SA. The plurality of resin lenses 22 are disposed on the third principal surface. The lens wafer 30W includes, as a base body, a glass wafer 31W including the fifth principal surface 31SA and the sixth principal surface 31SB on a side opposite to the fifth principal surface 31SA. The plurality of resin lenses 32 are disposed on the fifth principal surface 31SA. An optical device wafer 40W that is a filter wafer includes the seventh principal surface 41SA and the eighth principal surface 41SB on a side opposite to the seventh principal surface 41SA. The optical device wafer 40W may be a glass wafer in which a multi-layer filter is disposed.

The adhesive layer 50 is disposed on each of the resin lens 12 of the first lens wafer 10W, the resin lens 22 of the lens wafer 20W, and the resin lens 32 of the lens wafer 30W using a transfer method. The adhesive layer 50 is also disposed on at least either the sixth principal surface 31SB of the lens wafer 30W or the seventh principal surface 41SA of the optical device wafer 40W.

The adhesive layer 50 may be disposed using an inkjet method. The adhesive layer 50 is, for example, thermosetting epoxy resin. The adhesive layer 50 disposed on the resin lens 22 or the like may be, for example, a light shielding layer including light shielding particles. The optical device wafers (lens wafers) 10W to 40W are stacked and adhesively bonded together, so that the stacked wafer 1W is produced.

<Step S50> Disposition of Image Pickup Unit

The stacked wafer 2W is produced such that the plurality of image pickup units 60 are adhesively bonded to the eighth principal surface 41SB of the optical device wafer 40W using the adhesive layer 51. The image pickup unit 60 is manufactured by cutting an image pickup wafer in which a glass wafer is adhesively bonded, using a transparent adhesive, to an image pickup device wafer including a plurality of light receiving circuits. Note that the stacked wafer 2W may be produced by adhesively bonding the image pickup wafer to the stacked wafer 1W.

<Step S60> Cutting

Figure 9:
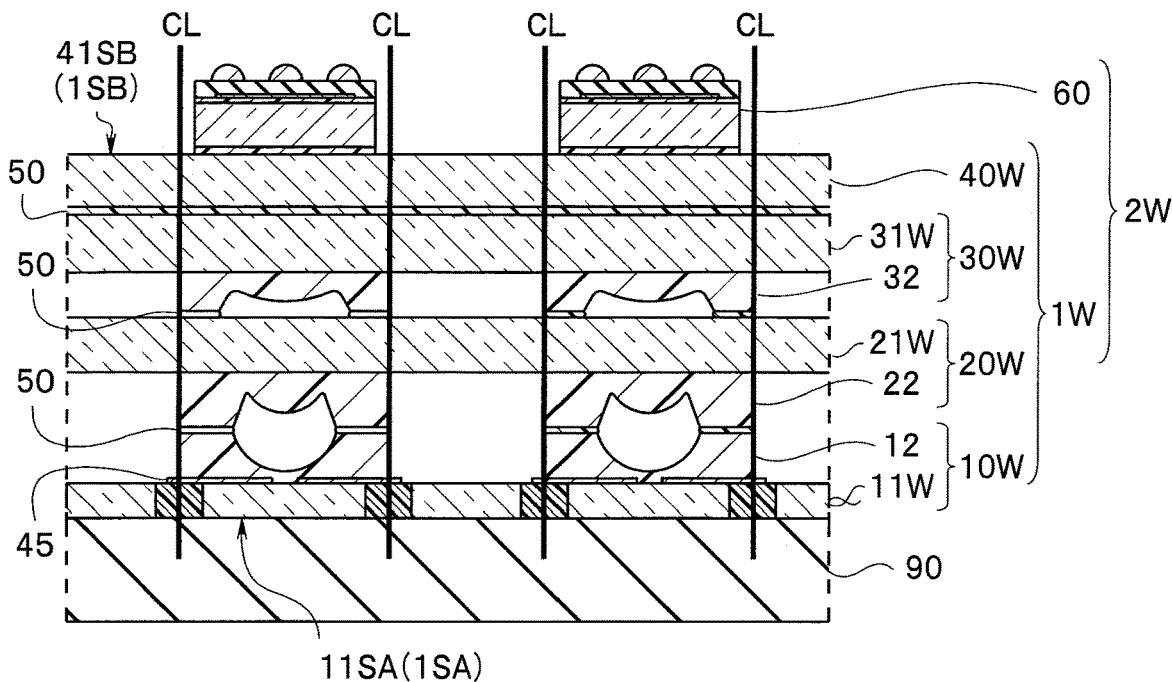
FIG. 9 is a cross-sectional view for explaining the manufacturing method of the image pickup apparatus of the first embodiment.

As shown in FIG. 9, in the stacked wafer 1W, the incident surface 1SA (first principal surface 11SA) of the first lens wafer 10W is attached to a fixation member such as a dicing tape 90. Then, the stacked wafer 2W is diced, from a side of the emission surface 1SB (eighth principal surface 41SB), in a grid pattern along cut lines CL including the plurality of holes H11 filled with the first resin 55 so as to be divided into the plurality of image pickup apparatuses 2 (the lens units 1). When the stacked wafer 1W is cut, the holes H11 become the grooves T11 leading to the second principal surface 11SB from the first principal surface 11SA of the first glass substrate 11.

The image pickup apparatus 2 is manufactured using a wafer-level method, and thus has a small diameter and is easy to manufacture. In cutting the stacked wafer 1W, chipping is particularly likely to occur on the glass substrate of the first lens wafer 10W attached to the dicing tape 90. In the first lens wafer 10W, the regions that become the four corners of the first glass substrate 11 are the holes H11, and the holes H11 are filled with the first resin 55. Therefore, the lens unit 1 and the image pickup apparatus 2 are easy to manufacture and are highly reliable because of no chipping on the glass substrate.

The image pickup apparatus 2 may be produced such that the image pickup unit 60 is disposed on the lens unit 1 manufactured by cutting the stacked wafer 1W.

In the lens unit 1, the grooves T11 are present in all the four corners of the first glass substrate 11 and the grooves T11 are all filled with the resin 55. However, it goes without saying that the lens unit in which the groove T11 is present only in one of the four corners of the first glass substrate 11 and only one groove T11 is filled with the resin 55 is easier to manufacture and is more highly reliable as compared to the lens unit without grooves in any of the four corners of the first glass substrate 11. In other words, in the first glass substrate 11, it is only necessary that at least one of the four corners of the first principal surface 11SA includes the groove T11 filled with the resin.

Second Embodiment

An image pickup apparatus and a lens unit of an embodiment described below are similar to and have the same effects as the effects of the image pickup apparatus 2 and the lens unit 1 of the first embodiment, and thus, the constituent elements having the same functions will be assigned the same reference numerals and the description will be omitted.

Figure 10:
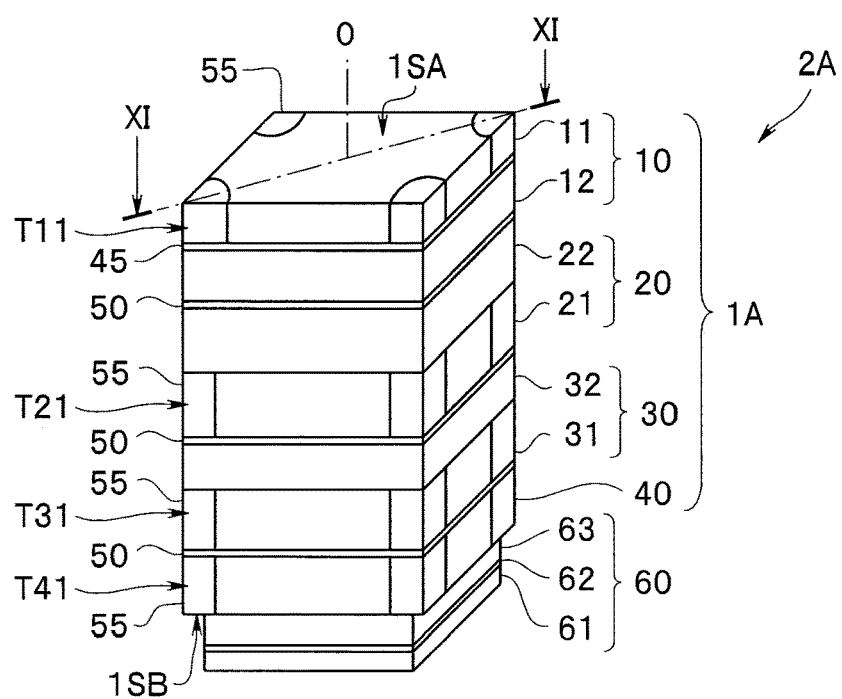
FIG. 10 is a perspective view of an image pickup apparatus of a second embodiment.
Figure 11:
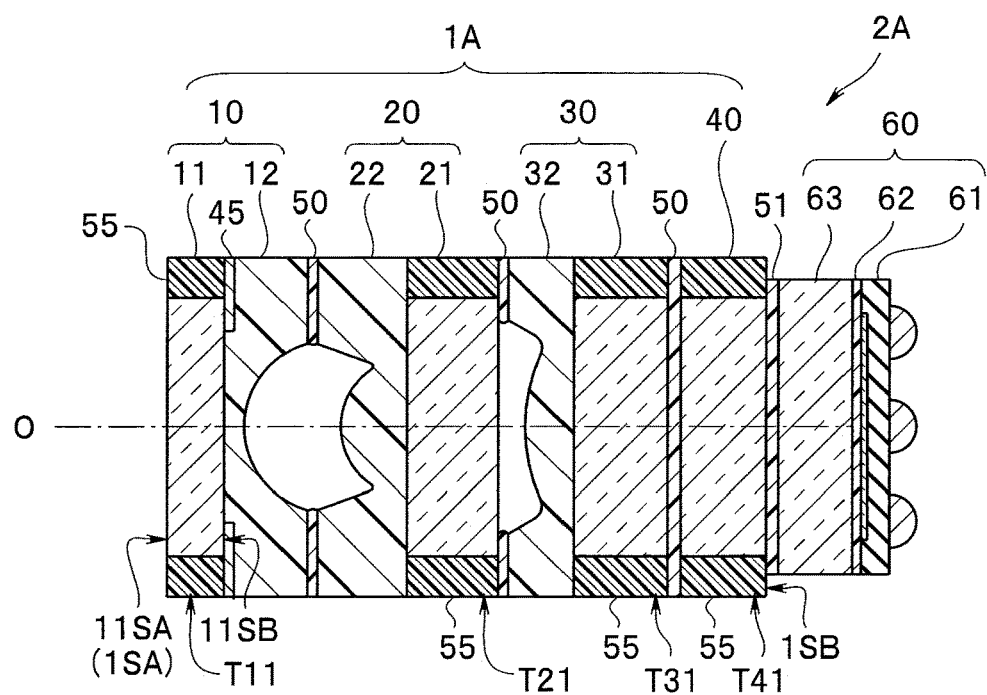
FIG. 11 is a cross-sectional view taken along line XI-XI of FIG. 10.

In a lens unit 1A of the present embodiment shown in FIG. 10 and FIG. 11, second grooves T21, third grooves T31, and fourth grooves T41 of four corners of the respective second glass substrate 21, third glass substrate 31, and fourth glass substrate 41 are also each filled with the first resin 55, as with the first glass substrate 11.

In other words, for example, a plurality of holes disposed in a grid pattern are formed on the glass wafer 21W that becomes the second glass substrate 21 and the plurality of holes are filled with the first resin 55.

In the lens unit 1A, chipping is unlikely to occur in cutting the stacked wafer also in the second glass substrate 21, the third glass substrate 31, and the fourth glass substrate 41, as with the first glass substrate 11, and thus the lens unit 1A is easy to manufacture and is highly reliable.

Third Embodiment

Figure 12:
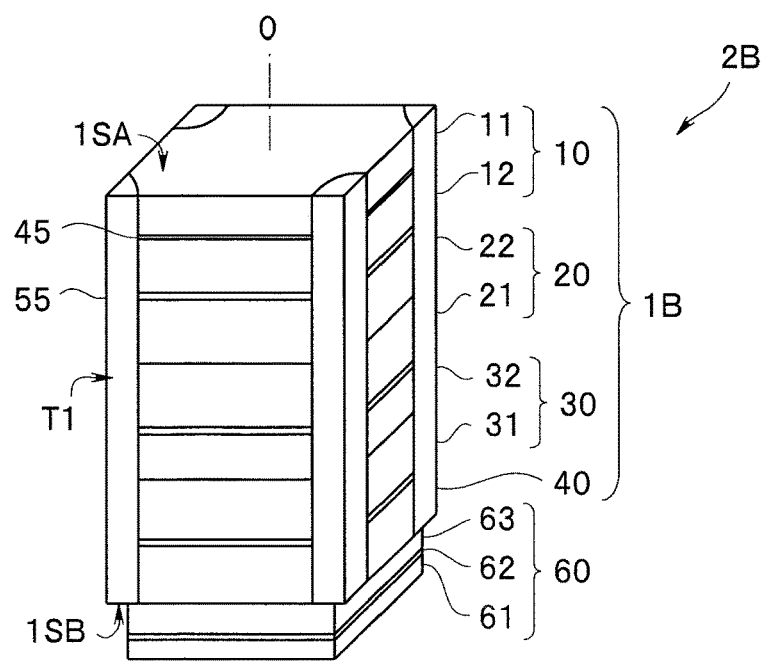
FIG. 12 is a perspective view of a lens unit of a third embodiment.

In a lens unit 1B of the present embodiment shown in FIG. 12, the resin lens 12, the resin lens 22, the resin lens 32, and the adhesive layer 50 also have the four corners on the outer edge cut out. In other words, in the lens unit 1B, corner grooves T1 of the four corners leading to the emission surface 1SB from the incident surface 1SA are filled with the first resin 55.

Figure 13:
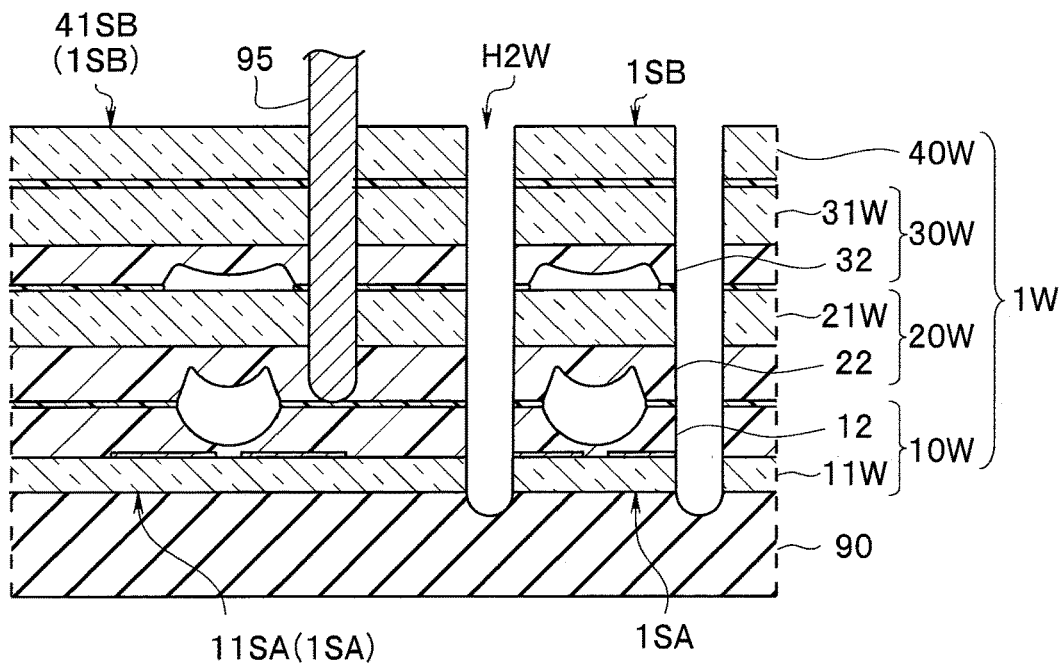
FIG. 13 is a cross-sectional view for explaining a manufacturing method of the lens unit of the third embodiment.

As shown in FIG. 13, in a method of manufacturing the lens unit 1B, holes are not formed on the first lens wafer 10W and the like before stacking. In the state of the stacked wafer 1W, holes H2W leading to the incident surface 1SA from the emission surface 1SB are formed in a grid pattern. The holes H2W with a circular opening are formed, for example, using a drill 95. The holes H2W are filled with the resin 55 and then, the stacked wafer 1W is cut, so that the holes H2W become the corner grooves T1.

The lens unit 1B is easier to manufacture and is more highly reliable as compared to the lens unit 1A in which the holes are formed in each of the plurality of lens wafers 10W, 20W, 30W, 40W including the first lens wafer 10W and are filled with resin. The image pickup unit 60 is disposed on the lens unit 1A, so that an image pickup apparatus 2A is manufactured. The image pickup apparatus 2A is easier to manufacture and is more highly reliable as compared to the image pickup apparatus 2.

Fourth Embodiment

Figure 14:
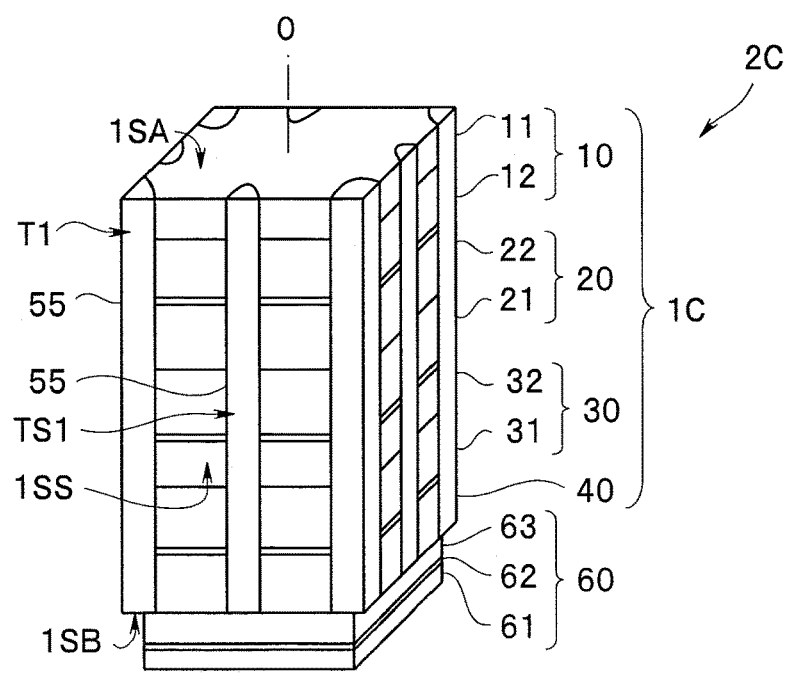
FIG. 14 is a perspective view of an image pickup apparatus of a fourth embodiment.

In a lens unit 1C of the present embodiment shown in FIG. 14, not only the four corners but also four side surfaces 1SS each include a side surface groove TS1 leading to the emission surface 1SB from the incident surface 1 SA, and the resin 55 is also filled in the side surface groove TS1. The side surface grooves TS1 are formed by cutting the holes of the stacked wafer, in the same manner as the corner grooves T1. A width of the side surface groove TS1, that is, a diameter of the hole of the stacked wafer may be smaller than a width of the corner groove T1. At least one of the four side surfaces 1SS may include the side surface groove TS1 leading to the emission surface 1SB from the incident surface 1SA, and the resin 55 may also be filled in the side surface groove TS1.

The resin 55 filled in the side surface groove TS1 has a function of protecting the resin lenses 12, 22, 32.

Fifth Embodiment

Figure 15:
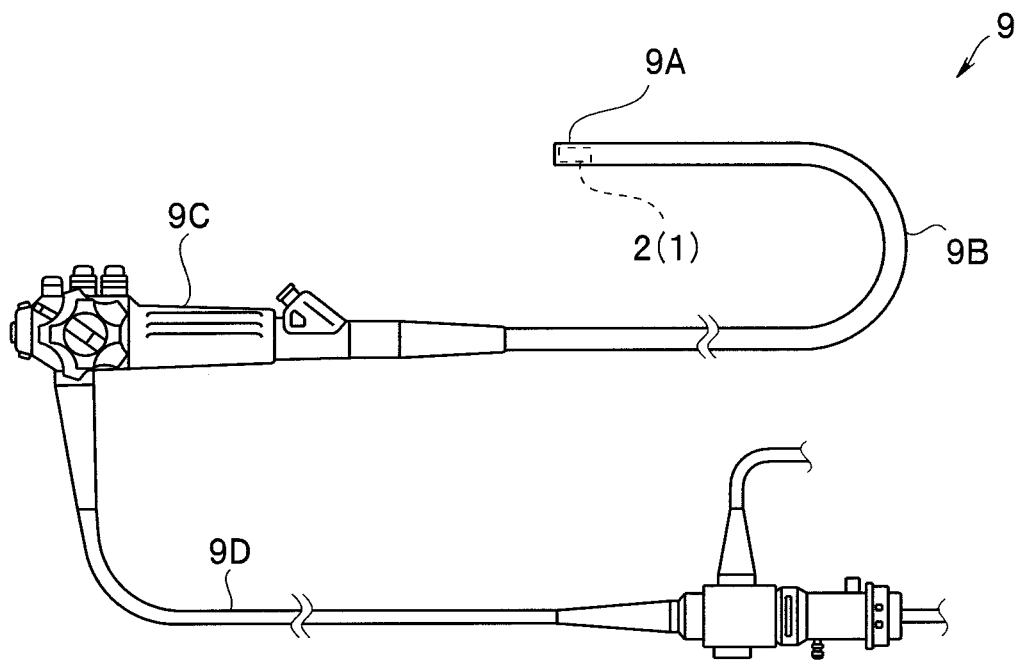
FIG. 15 is a perspective view of an endoscope of a fifth embodiment.

An endoscope 9 of the present embodiment shown in FIG. 15 includes a distal end portion 9A, an insertion portion 9B extending from the distal end portion 9A, an operation portion 9C disposed on a proximal end side of the insertion portion 9B, and a universal cord 9D extending from the operation portion 9C. The image pickup apparatus 2 (2A to 2C) including the lens unit 1 (1A to 1C) is disposed in the distal end portion 9A. An image pickup signal outputted from the image pickup apparatus 2 is transmitted to a processor (not shown) via a cable that passes through the universal cord 9D. A drive signal from the processor to the image pickup apparatus 2 is also transmitted via the cable that passes through the universal cord 9D.

The endoscope 9 may be a flexible endoscope with the insertion portion 9B that is flexible or a rigid endoscope with the insertion portion 9B that is rigid. The endoscope 9 may be for either medical use or industrial use.

The endoscope 9 includes the image pickup apparatus 2 (2A to 2C) including the lens unit 1 (1A to 1C), and thus, is easy to manufacture and is highly reliable.

The present invention is not limited to the aforementioned embodiments and the like, and various changes, combinations, and applications are available within the scope without departing from the gist of the invention.

What is claimed is:

1. An image pickup apparatus comprising:
   a lens unit including a plurality of optical devices, the plurality of optical devices having a common optical axis and including a first optical device, the first optical device including:
      a first glass substrate having a first principal surface and a second principal surface on a side opposite to the first principal surface, the first glass substrate having four side surfaces connecting the first principal surface and the second principal surface, and a groove leading to the second principal surface from the first principal surface in at least one of four corners on an outer edge, the at least one of the four corners of the first glass substrate being at an intersection of adjacent side surfaces of the four side surfaces of the first glass substrate;
      first resin disposed in the groove of the first glass substrate; and
      a resin lens disposed on the second principal surface; and
   an image pickup unit including an image pickup device, the image pickup unit being disposed on an optical device not including the first resin, of the plurality of optical devices.

2. The image pickup apparatus according to claim 1, wherein
   the first glass substrate includes the groove in each of the four corners, and
   the first resin is disposed in the groove in each of the four corners.

3. The image pickup apparatus according to claim 2, wherein
   the lens unit includes an incident surface and an emission surface on a side opposite to the incident surface, and
   the first principal surface is the incident surface.

4. The image pickup apparatus according to claim 3, wherein the lens unit further includes:
   a second optical device including a second glass substrate having a third principal surface and a fourth principal surface on a side opposite to the third principal surface, the third principal surface being substantially equal in size to the second principal surface and being disposed facing the second principal surface; and
   an adhesive layer configured to adhesively bond the first optical device and the second optical device together.

5. The image pickup apparatus according to claim 4, wherein:

the second glass substrate having four side surfaces connecting the third principal surface and the fourth principal surface, and the second optical device includes:
- a second groove leading to the fourth principal surface from the third principal surface in at least one of four corners on an outer edge of the second glass substrate, the at least one of the four corners of the second glass substrate being at an intersection of adjacent side surfaces of the four side surfaces of the second glass substrate; and
- the first resin disposed in the second groove of the second glass substrate.

6. The image pickup apparatus according to claim 1, wherein the first resin is disposed only on the first glass substrate.

7. The image pickup apparatus according to claim 1, wherein the optical device not including the first resin does not include the groove in any of the four corners on the outer edge.

8. An endoscope comprising an image pickup apparatus, the image pickup apparatus comprising:
- a lens unit including a plurality of optical devices, the plurality of optical devices having a common optical axis and including a first optical device, the first optical device including:
  - a first glass substrate having a first principal surface and a second principal surface on a side opposite to the first principal surface, the first glass substrate having four side surfaces connecting the first principal surface and the second principal surface, and a groove leading to the second principal surface from the first principal surface in at least one of four corners on an outer edge, the at least one of the four corners of the first glass substrate being at an intersection of adjacent side surfaces of the four side surfaces of the first glass substrate;
  - first resin disposed in the groove of the first glass substrate; and
  - a resin lens disposed on the second principal surface; and
- an image pickup unit including an image pickup device, the image pickup unit being disposed on an optical device not including the first resin, of the plurality of optical devices.

9. The endoscope according to claim 8, wherein
the lens unit includes an incident surface and an emission surface on a side opposite to the incident surface,
the first principal surface is the incident surface, and
the first resin is disposed only on the first glass substrate.

10. A method of manufacturing an image pickup apparatus, the method comprising:
- forming a plurality of holes disposed in a grid pattern on a glass wafer;
- filling each of the plurality of holes with first resin;
- disposing a plurality of resin lenses on the glass wafer to produce a first lens wafer including an incident surface;
- stacking a plurality of optical device wafers including the first lens wafer to produce a stacked wafer where the plurality of optical device wafers have a common optical axis;
- disposing an image pickup unit including an image pickup device on an optical device wafer including an emission surface and not including the first resin, of the plurality of optical device wafers; and
- dicing the stacked wafer along cut lines forming side surfaces of the glass wafer, the cut lines including the plurality of holes filled with the first resin at an intersection of adjacent side surfaces of the side surfaces of the glass wafer.

11. The method of manufacturing an image pickup apparatus according to claim 10, comprising dicing the stacked wafer with the first lens wafer attached to a dicing tape.

* * * * *